United States Patent
Tachikawa et al.

(10) Patent No.: US 6,187,858 B1
(45) Date of Patent: Feb. 13, 2001

(54) STABILIZED INSULATION COMPOSITION

(75) Inventors: Takeshi Tachikawa, Kanagawa; Koji Ishihara; Ariyoshi Ohki, both of Tokyo, all of (JP)

(73) Assignee: Nippon Unicar Company Limited, Ohtemachi (JP)

( * ) Notice: Under 35 U.S.C. 154(b), the term of this patent shall be extended for 0 days.

(21) Appl. No.: 09/293,582

(22) Filed: Apr. 16, 1999

(30) Foreign Application Priority Data

Sep. 9, 1998 (JP) .................................................. 10-255704

(51) Int. Cl.$^7$ ....................................................... C08K 5/14
(52) U.S. Cl. .......................... 524/581; 524/609; 524/611; 528/86; 428/379; 428/377
(58) Field of Search ..................................... 524/581, 609, 524/611, 576; 528/86; 428/379, 377

(56) References Cited

U.S. PATENT DOCUMENTS 5,536,777 * 7/1996 Ishikawa et al. ..................... 524/576

FOREIGN PATENT DOCUMENTS 58-191731   11/1983   (JP) .

* cited by examiner

*Primary Examiner*—Duc Truong
(74) *Attorney, Agent, or Firm*—Saul R. Bresch

(57) ABSTRACT

A composition comprising:

(a) polyethylene;
(b) as a first antioxidant, a thiobisphenol;
(c) as a second antioxidant, a compound containing 3-(3,5-di-t-butyl-4-hydroxyphenyl)propionate in the molecule;
(d) as a third antioxidant, distearyl thiodipropionate; and
(e) an organic peroxide, with the proviso that each antioxidant is present in an amount of about 0.01 to the about 0.2 part by weight and the organic peroxide is present in an amount of about 0.5 to about 3 parts by weight, all per 100 parts by weight of polyethylene.

4 Claims, No Drawings

STABILIZED INSULATION COMPOSITION

TECHNICAL FIELD

The present invention relates to a stabilized insulation composition used in cable construction.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

It is well known in the cable art that it is desirable to have insulation, which is crosslinkable, and superior with respect to the following properties: blooming prevention, anti-scorch, process stability, water tree retardancy, thermal distortion resistance, and heat aging resistance.

Crosslinked cables are typically prepared by extruding around an electrical conductor a compounded insulation composition comprising a polyethylene, one or more antioxidants, and a crosslinking agent, and curing same. When the insulation is processed into a cable, the resulting properties, mentioned above, are affected significantly by the kind and amount of the antioxidants, which are compounded into the insulation. Conventionally, thiobisphenol has been most widely used as the antioxidant of choice for cable insulation; however, when used as the only antioxidant, it has been known to cause various problems such as unsatisfactory heat aging resistance. This leads to blooming, which results in the deterioration of water tree retardancy because of the micro-voids produced by the blooming. On the other hand, if, in order to avoid the blooming, the compounding amount of the antioxidant is lowered, problems such as anti-scorch and process stability arise.

In order to solve this problem, it has been proposed to compound polyethylene with 4,4'-thiobis-(3-methyl-6-t-butylphenol), which is one of the thiobisphenols, and one other antioxidant as described in Japanese Patent Publications Gazette No. 9173/1987 or 36061/1987, but these combinations do not satisfactorily achieve the following properties: blooming prevention, anti-scorch, process stability, water tree retardancy, thermal distortion resistance, and heat aging resistance.

DISCLOSURE OF THE INVENTION

An object of this invention is to provide an insulation composition having a combination of antioxidants in effective amounts to provide the aforementioned desirable properties at a superior level. Other objects and advantages will become apparent hereinafter.

According to the invention, such an insulation composition has been discovered. The composition comprises:

(a) polyethylene;

(b) as a first antioxidant, a thiobisphenol;

(c) as a second antioxidant, a compound containing 3-(3, 5-di-t-butyl-4-hydroxyphenyl)propionate in the molecule;

(d) as a third antioxidant, distearyl thiodipropionate; and (e) an organic peroxide, with the proviso that each antioxidant is present in an amount of about 0.01 to the about 0.2 part by weight and the organic peroxide is present in an amount of about 0.5 to about 3 parts by weight, all per 100 parts by weight of polyethylene.

DESCRIPTION OF THE PREFERRED EMBODIMENT(S)

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.870 to about 0.930 gram per cubic centimeter. They also can have a melt index in the range of about 0.1 to about 50 grams per 10 minutes.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter and metallocene copolymers with densities less than 0.900 gram per cubic centimeter. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms, The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 1 to about 5 grams per 10 minutes, and preferably has a melt index in the range of about 0.75 to about 3 grams per 10 minutes. Melt index is determined under ASTM D-1238, Condition E. It is measured at 190 degrees C. and 2160 grams.

A preferred polyethylene is a homopolymer of ethylene made by a high pressure process having a density of 0.91 to 0.94 gram per cubic centimeter and a melt flow rate (or melt index) of 0.5 to 5 grams per 10 minutes. The total amount of the three antioxidants is about 0.2 to about 0.4 part by weight per 100 parts by weight of polyethylene. The polyethylene is granulated and is in pellet form.

It is preferable that density of the polyethylene is 0.91 to 0.94 gram per cubic centimeter. If it is below 0.91 gram per cubic centimeter, abrasion resistance becomes inferior, and, on the other hand, if it is above 0.94 gram per cubic centimeter, it is not desirable because its flexibility becomes poor. In addition, it is preferable that the melt flow rate of the polyethylene is about 0.5 to about 5 grams per 10 minutes. When the melt flow rate is below 0.5 grams per 10 minutes, processability is inferior, and when it is above 5 grams per 10 minutes, it is not desirable because mechanical strength, process stability and thermal distortion resistance become poor.

The thiobisphenols, the first antioxidant, are conventional and can be exemplified by 4,4'-thiobis(3-methyl-6-t-butylphenol), 4,4'-thiobis(6-t-butyl-ortho-cresol, and 2,2'-thiobis(4-methyl-6-t-butylphenol).

The second antioxidant is a compound containing 3-(3, 5-di-t-butyl-4-hydroxyphenyl)propionate in the molecule. Thus, it can be the ester per se; a salt of 3-(3,5-di-t-butyl-4-hydroxyphenyl)propionic acid; pentaerythritol-tetrakis[3-(3,5-di-t-butyl-4-hydroxyphenyl)propionate]; or octadecyl-3-(3,5-di-t-butyl-4-hydroxyphenyl)propionate.

The third antioxidant is distearyl thiodipropionate.

All of the above are known antioxidants prepared by conventional processes.

As noted above, the compounding amount of each of the three antioxidants is about 0.01 to about 0.2 part by weight per 100 parts by weight of polyethylene. If each compounding amount is less than about 0.01 part by weight, heat aging resistance and anti-scorch are inferior, and, on the other hand, if each compounding amount is above 0.2 part by weight, it is not desirable since blooming and electrical properties are poor. The total compounding amount of the three antioxidants is not limited provided that the individual ranges are maintained; however, it is preferable that the total is about 0.2 to about 0.4 part by weight. It is found that two of the three antioxidants will not provide superior properties, particularly those of heat aging resistance and blooming resistance. It is noted that the thiobisphenols in the composition of the invention will not cause blooming even at the required amounts.

Further, it is known that the thiobisphenols by themselves have a solubility level in polyethylene of no more than 0.07 percent by weight based on the weight of the polyethylene, and that an amount of at least 0.1 percent by weight of an antioxidant based on the weight of the polyethylene is necessary to maintain satisfactory heat resistance. Thus, the use of thiobisphenols per se at their solubility level does not maintain satisfactory heat resistance and causes blooming. It is unexpectedly found that the use of the thiobisphenols in the three antioxidant combination of this invention raises the solubility level of the thiobisphenols and also permits the use of the total amount of antioxidants of less than 0.1 percent by weight based on the weight of the polyethylene. As noted, however, it is preferable that the total is at least about 0.2 percent by weight.

The organic peroxide used in the present invention can be any one, which is generally used in cables as a cross-linking agent. Examples of the organic peroxides are di-t-butyl-peroxide; 1,1-bis-t-butyl-peroxybenzoate; 2,2-bis-t-butyl-peroxybutane; t-butyl-peroxybenzoate, dicumyl peroxide; 2,5-dimethyl-2,5-di-t-butyl-peroxyhexane; t-butyl-cumylperoxide; and 2,5-dimethyl-2-5-di-t-butyl-peroxyhexene-3. It is preferable if the one minute half life decomposition temperature of the organic peroxide is about 150 to about 200 degrees C.

The compounding amount of organic peroxide can be about 0.5 to about 3 parts by weight per 100 parts by weight of polyethylene. If the compounding amount is less than about 0.5 part by weight, thermal distortion becomes inferior, and, on the other hand, if it is above 3 parts by weight, it is not preferable because anti-scorch is poor.

The insulation composition of this invention is prepared by mixing the components as well as other additives and kneading evenly in temperatures at or above the melt temperature of the polyethylene but below the decomposition temperature of the organic peroxide using an ordinary kneader such as a BanburyTM mixer, a continuous mixer, a roller or an extruder. The kneaded material is then granulated or pelletized. Alternatively, all of the components and additives except the organic peroxide can be processed in this manner, and then a liquid organic peroxide can be impregnated into the granulated material or pellet.

The composition of the invention can be processed in various types of extruders, e.g., single or twin screw types, single layer or three layer co-extruder. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 130 to about 260 degrees C., and preferably in the range of about 170 to about 220 degrees C.

The extrudate can be crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction. Crosslinking can also be effected through a long-land die.

Conventional additives can be added to the polymer either before or during processing. The amount of additive is usually in the range of about 0.01 to about 50 percent by weight based on the weight of the resin. Useful additives are ultraviolet absorbers, antistatic agents, pigments, carbon black, dyes, fillers, slip agents, fire retardants, plasticizers, processing aids, lubricants, smoke inhibitors, halogen scavengers, flow aids, lubricants, water tree inhibitors such as polyethylene glycol, viscosity control agents, foaming and defoaming agents, scorch inhibitors, and cure boosters. The various polymers mentioned above as well as other resins can be blended with the base resin to improve properties.

In order to provide a semiconducting shield it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, and N110, and acetylene black.

Advantages of the invention are the following superior properties: blooming prevention, anti-scorch, process stability, water tree retardancy, thermal distortion resistance, and heat aging resistance.

The higher the extrusion temperature, the hotter the resin composition going into the CV tube to be crosslinked and, thus, the faster the cure rate, simply because the resin composition doesn't have to be heated up as much for the cure step. The maximum extrusion temperature relates to the decomposition temperature of the organic peroxide, i.e., the extrusion temperature cannot be as high as the temperature at which significant decomposition of the peroxide takes place. Thus, it is advantageous to be able to use an organic peroxide having a higher decomposition temperature if the other components of the composition of the invention will tolerate a higher extrusion temperature.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above. The conductors can be electrical or communications media such as glass fibers or fiber optics.

All molecular weights mentioned in this specification are weight average molecular weights unless otherwise designated.

This specification is based on Japanese patent application 255704/1998 filed on Sep. 9, 1998.

The patents, patent applications, and publications mentioned in this specification are incorporated by reference herein.

The invention is illustrated by the following examples.

EXAMPLES

Evaluation Methods Used in the Examples:

Blooming resistance: Approximately 10 grams of pellets are left for one month at a constant temperature and constant humidity at 23 degrees C. and 50 percent humidity; the pellets are then weighed; the surface of the pellets is washed with 25 cubic centimeters of chloroform; and the washed solvent is analyzed by liquid chromatography to determine what the antioxidants are. The total amount determined is treated as the blooming amount of the antioxidants. Those, which show a blooming amount of 1000 ppm or less, are judged to pass the test.

Anti-scorch: Torque values for 30 minutes with a test temperature of 140 degrees C. are determined by using a roller-less rheometer specified in ISO (International Organization for Standardization) 6502, and one which shows a difference between the minimum and the torque value at 30 minutes of 0.5 or less is judged to pass the test.

Process stability: Pellets left for 3 months at room temperature are extruded by an extruder having a length to diameter ratio of 25. Pressure at the strand die head and motor torque of the extruder are carefully observed, and extrudate which shows no fluctuation is judged to pass the test.

Heat aging resistance: JIS (Japanese Industrial Standard) C3005, paragraph 19, is applied. The heating temperature is 160 degrees C., and a residual ratio of 8 percent or more after 4 days is judged to pass the test.

Thermal distortion resistance: JIS C3005, paragraph 25, is applied.

Water tree retardancy: Pellets left for 1 month at a constant temperature and constant humidity of 23 degrees C. and 50 percent humidity are preformed into a sheet by using a press molder at 120 degrees C. The 3 millimeter sheet is crosslinked at a temperature of 180 degrees C., and is charged with a one kilovolt/1000 Herz alternating current voltage for 500 hours by using a water tree electrode. The 3 millimeter sheet so charged is sliced into approximately 0.1 millimeter slices; 10 slices are prepared, immersed in a methylene blue solution, and dyed. The dyed slices are observed under a microscope, and those which do not show water tree formation are judged to pass the test.

In example 1, 0.1 part by weight of 4.4'-thiobis(3-methyl-6-t-butylphenol), 0.1 part by weight of pentaerythritol-tetrakis[3,5-di-t-butyl-4-hydroxyphenyl)propionate], and 0.1 part by weight of distearyl thiodipropionate are compounded into 100 parts by weight of a high-pressure low-density polyethylene (melt flow rate: 2 grams per 10 minutes; density: 0.922 gram per cubic centimeter); kneaded for 10 minutes at 180 degrees C. in a Banbury™ mixer; and extruded into pellets of 2.5 millimeter diameter and 2.5 millimeter length.

Dicumyl peroxide is liquefied by heating to 60 degrees C. and is added to the pellets. The peroxide and the pellets are mixed for 30 minutes in a blender to impregnate the dicumyl peroxide into the polyethylene pellets. Evaluations on blooming resistance, anti-scorch, and process stability are carried out by using the polyethylene pellets impregnated with the dicumyl peroxide. In addition, the pellets impregnated with the dicumyl peroxide are preformed into a sheet by using a press molder at 120 degrees C., and the resin is crosslinked at 180 degrees C. The crosslinked sheet is cut into a predetermined dumbbell form to make test pieces and its heat aging resistance, thermal distortion resistance, and water tree retardancy are evaluated by the methods described above.

The other examples are carried out as set forth in example 1. The variables and evaluation results are shown in Tables I and II. Amounts of components are given in parts by weight.

The evaluation results show that examples 1 to 7 are superior on every evaluation item, i.e. they pass the tests for blooming resistance, anti-scorch, process stability, heat aging resistance, thermal distortion resistance, and water tree retardancy. As for the evaluation results in comparative examples 1 to 9, the results are unsatisfactory.

Namely:

Comparative example 1 is a composition that only contains one antioxidant, and the composition fails the blooming resistance and water tree retardancy tests.

Comparative examples 2, 3, and 4 are compositions that contain only two antioxidants, each in an amount of 0.15 pph (part by weight per 100 parts by weight of base resin). The blooming resistance is inferior or slightly inferior, and the process stability and heat aging resistance fail the evaluation.

Comparative examples 5, 6, and 7 are compositions that contain only two antioxidants, 0.07 pph of antioxidant A and 0.2 pph of the other antioxidant. Though the blooming resistance is superior, the process stability and heat aging resistance do not pass the evaluation. Moreover, comparative examples 5 and 6 fail the anti-scorch test.

Comparative example 8 is a composition that contains the three antioxidants, but the amount of antioxidant A is in excess of the upper limit. The blooming resistance and water tree retardancy do not pass the evaluation.

Comparative example 9 is a composition that contains the three antioxidants, but the amount of antioxidant A is below the lower limit. The anti-scorch, process stability, and heat aging resistance fail.

TABLE 1

(Embodiments of the Invention)

| Example | 1 | 2 | 3 | 4 |
|---|---|---|---|---|
| HP-LDPE | 100 | 100 | 100 | 100 |
| A/O A | 0.1 | 0.1 | 0.02 | 0.08 |
| A/O B | 0.1 | — | — | — |
| A/O C | — | 0.1 | 0.08 | 0.2 |
| A/O D | 0.1 | 0.1 | 0.2 | 0.02 |
| dicumyl peroxide | 1.6 | 1.6 | 1.6 | 1.6 |
| blooming resistance (ppm) | 350 | 300 | 200 | 300 |
| anti-scorch | 0.24 | 0.26 | 0.42 | 0.4 |
| process stability | PASS | PASS | PASS | PASS |
| heat aging resistance: tensile strength (%) | 90 | 90 | 85 | 85 |
| tensile elongation (%) | 90 | 90 | 85 | 85 |
| thermal distortion resistance (%) | 70 | 70 | 70 | 70 |
| water tree retardancy | PASS | PASS | PASS | PASS |

| Example | 5 | 6 | 7 |
|---|---|---|---|
| HP-LDPE | 100 | 100 | 100 |
| A/O A | 0.08 | 0.2 | 0.1 |
| A/O C | 0.02 | 0.05 | 0.05 |
| A/O D | 0.2 | 0.05 | 0.05 |
| dicumyl peroxide | 1.6 | 1.6 | 1.6 |
| blooming resistance (ppm) | 200 | 800 | 300 |
| anti-scorch | 0.3 | 0.18 | 0.32 |
| process stability | PASS | PASS | PASS |
| heat aging resistance: tensile strength (%) | 90 | 90 | 90 |
| tensile elongation (%) | 90 | 90 | 90 |
| thermal distortion resistance (%) | 70 | 70 | 70 |
| water tree retardancy | PASS | PASS | PASS |

TABLE II (Comparative Examples)

| Example | 1 | 2 | 3 | 4 | 5 |
|---|---|---|---|---|---|
| HP-LDPE | 100 | 100 | 100 | 100 | 100 |
| A/O A | 0.2 | 0.15 | 0.15 | 0.15 | 0.07 |
| A/O B | — | 0.15 | — | — | 0.2 |
| A/O C | — | — | 0.15 | — | — |
| A/O D | — | — | — | 0.15 | — |
| dicumyl peroxide | 1.6 | 1.6 | 1.6 | 1.6 | 1.6 |
| blooming resistance (ppm) | 1100 | 1000 | 900 | 800 | 300 |
| anti-scorch | 0.2 | 0.35 | 0.37 | 0.3 | 0.58 |
| process stability | PASS | FAIL | FAIL | FAIL | FAIL |
| heat aging resistance: tensile strength (%) | 90 | 75 | 75 | 75 | 50 |
| tensile elongation (%) | 90 | 80 | 80 | 80 | 50 |
| thermal distortion resistance (%) | 80 | 70 | 70 | 70 | 70 |
| water tree retardancy | FAIL | PASS | PASS | PASS | PASS |

| Example | 6 | 7 | 8 | 9 |
|---|---|---|---|---|
| HP-LDPE | 100 | 100 | 100 | 100 |
| A/O A | 0.07 | 0.07 | 0.3 | 0.005 |
| A/O C | 0.2 | — | 0.05 | 0.15 |
| A/O D | — | 0.2 | 0.05 | 0.15 |
| dicumyl peroxide | 1.6 | 1.6 | 1.6 | 1.6 |
| blooming resistance (ppm) | 300 | 300 | 1800 | 100 |
| anti-scorch | 0.61 | 0.42 | 0.14 | 0.55 |
| process stability | FAIL | FAIL | PASS | FAIL |
| heat aging resistance: tensile strength (%) | 50 | 50 | 90 | 75 |
| tensile elongation (%) | 50 | 50 | 90 | 80 |
| thermal distortion resistance (%) | 70 | 70 | 90 | 60 |
| water tree retardancy | PASS | PASS | FAIL | PASS |

Notes to Tables:
1. HP-LDPE=a hompolymer of ethylene having a melt flow rate of 2 grams per 10 minutes and a density of 0.922 gram per cubic centimeter.
2. A/O A=an antioxidant, 4,4'-thiobis(3-methyl-6-t-butylphenol).
3. A/O B=pentaerythritol-tetrakis[3-(3,5-di-t-butyl-4-hydroxyphenyl)propionate].
4. A/O C.=octadecyl-3-(3,5-di-t-butyl-4-hydroxyphenyl) propionate.
5. A/O D=distearyl thiodipropionate.

What is claimed is:
1. A composition comprising:
 (a) polyethylene;
 (b) as a first antioxidant, a thiobisphenol;
 (c) as a second antioxidant, a compound containing 3-(3, 5-di-t-butyl-4-hydroxy-phenyl)propionate in the molecule;
 (d) as a third antioxidant, distearyl thiodipropionate; and
 (e) an organic peroxide,
with the proviso that each antioxidant is present in an amount of about 0.01 to the about 0.2 part by weight and the organic peroxide is present in an amount of about 0.5 to about 3 parts by weight, all per 100 parts by weight of polyethylene.

2. The composition defined in claim 1 wherein the first antioxidant is 4,4'-thiobis(3-methyl-6-t-butylphenol), 4,4'-thiobis(6-t-butyl-ortho-cresol, or 2,2'-thiobis(4-methyl-6-t-butylphenol).

3. The composition defined in claim 1 wherein the total amount of antioxidants is in the range of about 0.2 to about 0.4 part by weight based on 100 parts by weight of polyethylene.

4. The composition defined in claim 1 wherein the polyethylene has a density in the range of 0.91 to 0.94 gram per cubic centimeter and a melt flow rate in the range of about 0.5 to about 5 grams per 10 minutes.

* * * * *